(12) United States Patent
Walter et al.

(10) Patent No.: US 9,751,431 B2
(45) Date of Patent: Sep. 5, 2017

(54) SEAT TRACK ASSEMBLY HAVING LOAD ABSORPTION FEATURES

(71) Applicant: LEAR CORPORATION, Southfield, MI (US)

(72) Inventors: Klaus Walter, Pederborn (DE); Michael Wojatzki, Ennigerloh (DE); Alfred Cziomer, Rietberg (DE); Marc Laumeier, Langenberg-Benteler (DE)

(73) Assignee: Lear Corporation, Southfield, MI (US)

(*) Notice: Subject to any disclaimer, the term of this patent is extended or adjusted under 35 U.S.C. 154(b) by 55 days.

(21) Appl. No.: 14/730,815

(22) Filed: Jun. 4, 2015

(65) Prior Publication Data

US 2015/0367754 A1    Dec. 24, 2015

(30) Foreign Application Priority Data

Jun. 23, 2014    (DE) .................... 10 2014 211 993

(51) Int. Cl.
*B60N 2/07*    (2006.01)

(52) U.S. Cl.
CPC ........... *B60N 2/0705* (2013.01); *B60N 2/073* (2013.01); *B60N 2/0715* (2013.01)

(58) Field of Classification Search
CPC .. B60N 2/0722; B60N 2/4242; B60N 2/0705; B60N 2/0715; B60N 2/073
USPC ............................ 297/344.11; 248/429, 430
See application file for complete search history.

(56) References Cited

U.S. PATENT DOCUMENTS

| 4,533,107 A | 8/1985 | Okazaki et al. |
| 4,776,551 A | 10/1988 | Nishino |
| 4,941,637 A | 7/1990 | Pipon |
| 5,048,787 A | 9/1991 | Saitoh |
| 5,785,292 A * | 7/1998 | Muraishi ............... B60N 2/071 248/429 |
| 6,578,810 B2 | 6/2003 | Eguchi et al. |

(Continued)

FOREIGN PATENT DOCUMENTS

| CN | 1792666 A | 6/2006 |
| CN | 101130356 A | 2/2008 |

(Continued)

OTHER PUBLICATIONS

Office Action issued in corresponding German Patent Application No. 102014211993.6 (dated Mar. 2, 2015).

(Continued)

*Primary Examiner* — Philip Gabler
(74) *Attorney, Agent, or Firm* — Fishman Stewart PLLC

(57) ABSTRACT

A seat track assembly may include a lower seat track having a pair of opposing outer rails and an upper seat track having a pair of opposing inner rails. The inner rails of the upper seat track may cooperate with the outer rails of the lower seat track to support the upper seat track for movement on the lower seat track. A support member may be provided between the lower seat track and the upper seat track. The support member may include a portion that extends in a vertical direction between the lower seat track and the upper seat track to restrict vertical movement of the upper seat track relative to the lower seat track. The support member may also include a portion that extends in a lateral direction between the inner rails of the upper seat track to restrict the inner rails from deforming inwardly toward one another.

20 Claims, 4 Drawing Sheets

(56) References Cited

U.S. PATENT DOCUMENTS

| | | | |
|---|---|---|---|
| 7,293,752 B2 | 11/2007 | McCulloch et al. | |
| 7,309,107 B2 * | 12/2007 | Smith | B60N 2/0705 248/429 |
| 7,597,303 B2 | 10/2009 | Kimura et al. | |
| 7,798,462 B2 * | 9/2010 | Yoshida | B60N 2/0705 248/424 |
| 7,992,834 B2 * | 8/2011 | Kojima | B60N 2/0725 248/424 |
| 8,052,111 B2 | 11/2011 | Bernhardt et al. | |
| 8,708,300 B2 * | 4/2014 | Fujishiro | B60N 2/0705 248/424 |
| 9,027,899 B2 * | 5/2015 | Haller | B60N 2/0705 248/424 |
| 2002/0033625 A1 * | 3/2002 | Goy | B60N 2/0705 297/344.18 |
| 2008/0048086 A1 | 2/2008 | Kojima et al. | |
| 2010/0090083 A1 * | 4/2010 | Kojima | B60N 2/0727 248/429 |
| 2011/0233365 A1 * | 9/2011 | Kato | B60N 2/0702 248/429 |

FOREIGN PATENT DOCUMENTS

| | | | |
|---|---|---|---|
| DE | 29705623 U1 | 5/1997 | |
| DE | 102010026214 A1 * | 2/2011 | B60N 2/0722 |
| JP | 2008149842 A | 7/2008 | |
| JP | 2010264961 A | 11/2010 | |
| KR | 1020080106639 | 12/2008 | |

OTHER PUBLICATIONS

English language translation (machine) of application of DE 29705623.

English language translation (machine) of abstract of KR 1020080106639.

* cited by examiner

SEAT TRACK ASSEMBLY HAVING LOAD ABSORPTION FEATURES

TECHNICAL FIELD

The present disclosure relates to seat track assemblies, including a seat track assembly having load absorption features that are configured to provide added support to the seat track assembly.

BACKGROUND

Passenger vehicles, such as automobiles for example, may include seat assemblies that can be configured to support occupants within the vehicle. A seat assembly may include a seat bottom and a seat back, which can be supported on the seat bottom. In turn, the seat bottom may be secured to or otherwise supported on a floor located within a passenger compartment of the vehicle. For example, the seat assembly may be supported on a pair of seat track assemblies for movement in the fore and aft directions (i.e., forward and backward) along the floor of the vehicle.

A seat track assembly may generally include a lower seat track and an upper seat track. The lower seat track can be mounted to or otherwise provided on the floor of the vehicle. The upper seat track can be supported for sliding movement on the lower seat track. In turn, the seat assembly can be mounted to or otherwise supported on the upper seat track. Moreover, the seat track assembly may also include a seat track locking mechanism provided between the lower and upper seat tracks to selectively lock or otherwise prevent sliding movement of the upper seat track relative to the lower seat track.

In an effort to reduce the overall weight of vehicles, seat assemblies have been developed and are currently being developed which are relatively lighter than previous seat designs. However, as a result of such weight reductions, various components that are generally used in seat assemblies, such as seat track assemblies for example, may need to accommodate relatively higher deformation rates when subjected to large loads.

Thus, although current seat track assemblies function in an acceptable manner, it may be desirable to provide an improved seat track assembly having load absorption features that are configured to provided added support to the seat rack assembly and eliminate or reduce deformation of the seat tracks.

SUMMARY

A seat track assembly in accordance with an embodiment of the present disclosure may include a lower seat track having a pair of opposing outer rails and an upper seat track having a pair of opposing inner rails. The inner rails of the upper seat track may cooperate with the outer rails of the lower seat track to support the upper seat track for movement on the lower seat track. A support member may be provided between the lower seat track and the upper seat track. The support member may include a portion that extends in a vertical direction between the lower seat track and the upper seat track to restrict vertical movement of the upper seat track relative to the lower seat track. The support member may also include a portion that extends in a lateral direction between the inner rails of the upper seat track to restrict the inner rails from deforming inwardly toward one another.

A seat assembly is also provided in accordance with an embodiment of the present disclosure and may include a seat track assembly as generally described and illustrated in the present disclosure.

Various aspects of this present disclosure will become apparent to those skilled in the art from the following detailed description of the preferred embodiment, when read in light of the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments, it should be understood that they are not intended to limit the present disclosure to these embodiments. On the contrary, the present disclosure is intended to cover alternatives, modifications and equivalents, which may be included within the spirit and scope of the invention as defined by the appended claims. Relative terms such as "lower," "upper," "upwardly," "downwardly," "vertical," "horizontal," and "lateral" are used throughout this disclosure to provide convenient reference and are not intended to limit the scope or orientation of the components which they describe.

Figure 1:
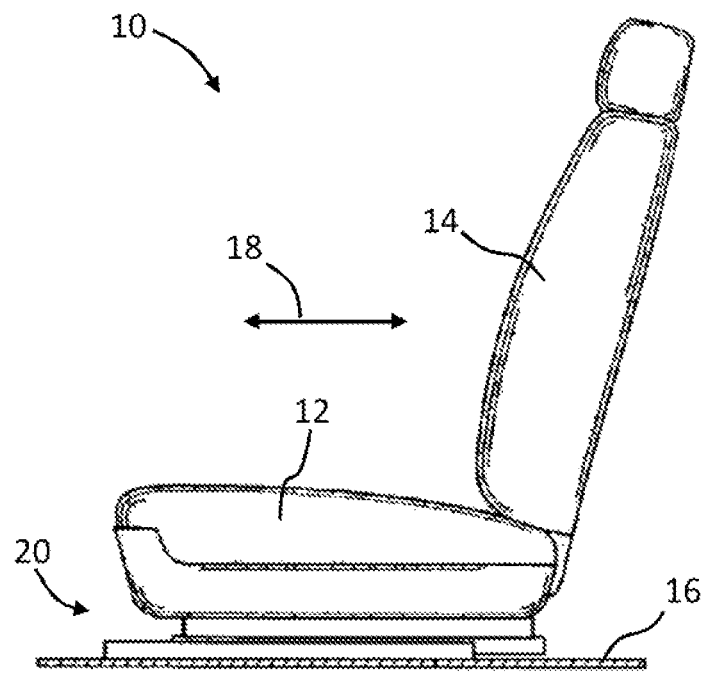
FIG. 1 is a side view of a vehicle seat assembly supported on at least one seat track assembly according to an embodiment of the present disclosure.

Referring now to FIG. 1, a seat assembly according to an embodiment of the present disclosure is generally illustrated at 10. In a non-limiting embodiment, the seat assembly 10 may be configured to support an occupant in a vehicle, such as in an automobile or other type of passenger vehicle. The seat assembly 10 may include a seat bottom 12 and a seat back 14, which can be supported on the seat bottom 12. In turn, the seat bottom 12 can be secured to or otherwise supported on a floor 16 within a passenger compartment of the vehicle.

In an embodiment, the seat assembly 10 may be supported on at least one seat track assembly 20. For example and without limitation, the seat assembly 10 may be supported on a pair of seat track assemblies 20 that are laterally spaced apart from one another. As will be generally disclosed below, the seat track assemblies 20 may be configured to support the seat assembly 10 on the floor 16 of the vehicle for longitudinal movement in the fore and aft directions (i.e., forward and backward), as indicated by the direction arrow 18 in FIG. 1. A seat track locking mechanism may be optionally provided on the seat track assembly 20 to lock the seat assembly 10 in a selected position. It should be appreciated that the seat track assembly 20 is not limited for use with the illustrated seat assembly 10 or in passenger vehicles in general, but can be used in other suitable environments and for other suitable purposes.

Figure 2:
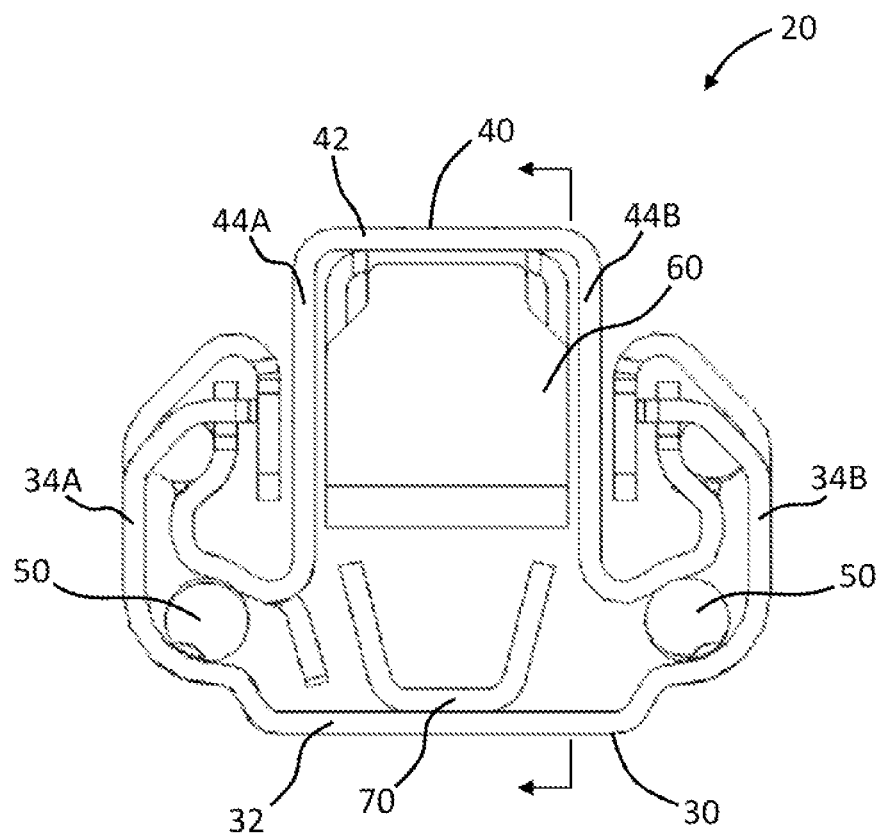
FIG. 2 is an enlarged front end view of a seat track assembly as generally shown in FIG. 1.
Figure 3:
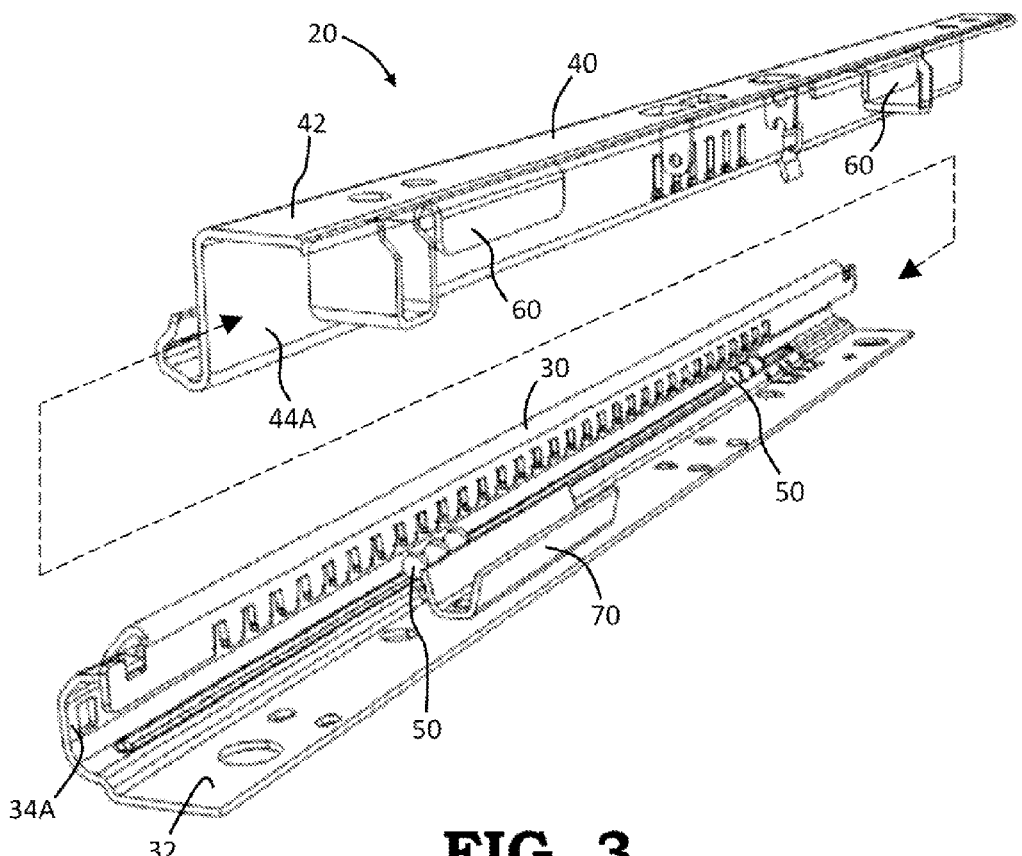
FIG. 3 is a partially exploded, cross-sectional perspective view of the seat track assembly shown in FIG. 2.
Figure 4:
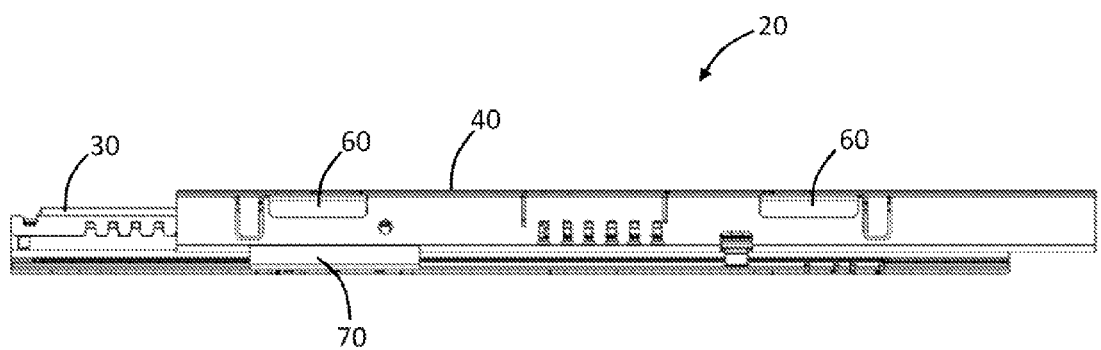
FIG. 4 is a cross-sectional side view of the seat track assembly shown in FIGS. 2 and 3.

Referring now to FIGS. 2 and 3, a seat track assembly according to an embodiment of the present disclosure is generally illustrated at 20. The seat track assembly 20 may include a first or lower seat track 30 and a second or upper seat track 40, respectively. The lower seat track 30 can be secured to or otherwise supported on a floor 16 (shown in FIG. 1) within a passenger compartment of the vehicle using fasteners or other suitable connections for example.

The upper seat track 40 can be supported for sliding movement on the lower seat track 30. For example and without limitation, a plurality of bearing elements 50 (e.g., ball bearings) may be disposed between portions of the lower seat track 30 and upper seat track 40, as will be generally disclosed below. In turn, the seat assembly 10 (shown in FIG. 1) may be secured to or otherwise supported on the upper seat track 40. It should be appreciated that the seat track assembly 20 may include additional components and/or additional structural features without departing from the scope of the present disclosure.

In an embodiment, the lower seat track 30 may be an elongated track member and can define a generally U-shaped track when viewed from an end thereof, such as generally shown in FIG. 2. For example and without limitation, the lower seat track 30 can have a base portion 32 and a pair of opposing outer rails 34A and 34B that may extend in a generally upward direction from opposite edges of the lower base portion 32, respectively. In other embodiments, however, the lower seat track 30 may have other suitable shapes and can include additional components and/or additional structural features without departing from the scope of the present disclosure.

The upper seat track 40 may also be an elongated track member and can define a generally U-shaped track that is inverted (i.e., oriented upside down relative to the lower seat track 30) when viewed from an end thereof, such as generally shown in FIG. 2. For example and without limitation, the upper seat track 40 may have an upper base portion 42 and a pair of opposing inner rails 44A and 44B that may extend in a generally downward direction from opposite edges of the upper base portion 42, respectively. In other embodiments, however, the upper seat track 40 may have other suitable shapes and can include additional components and/or additional structural features without departing from the scope of the present disclosure.

As generally shown in FIG. 2, when the lower seat track 30 and the upper seat track 40 are assembled together, portions of the inner rails 44A and 44B of the upper seat track 40 cooperate with and are spaced from portions of the outer rails 34A and 34B of the lower seat track 30. A plurality of bearing elements 50 may be disposed between the spaced portions of the outer rails 34A and 34B and the inner rails 44A and 44B, respectively. As a result, the upper seat track 40 can be supported for sliding movement in a longitudinal direction along the lower seat track 30. While it should be appreciated that the seat track assembly 20 may be designed or otherwise configured to achieve a reduction in the overall weight of the seat assembly 10, the present disclosure is not limited to the illustrated seat track assembly 20 but may include other suitable seat track configurations and/or designs.

With respect to the present disclosure, the seat track assembly 20 may include load absorption features configured to reduce deformation of the lower seat track 30 and/or the upper seat track 40, such as when a relatively high load is applied to the seat assembly 10. As generally disclosed below, the load absorption features can be configured to provide added support to the lower seat track 30 and/or the upper seat track 40. For example and without limitation, the load absorption features may be designed to absorb loads and/or transfer loads from the seat assembly 10 to the floor 16, or more specifically, to a frame of the vehicle.

In a non-limiting embodiment, a first support member, such as a stiffening member 60, may be provided on the upper seat track 40. As generally shown in FIG. 3, a portion of the stiffening member 60 may extend in a generally vertical direction toward the lower seat track 30. In other embodiments, however, the stiffening member 60 may be provided on the lower seat track 30 and extend in a generally vertical direction toward the upper seat track 40.

Figure 5:
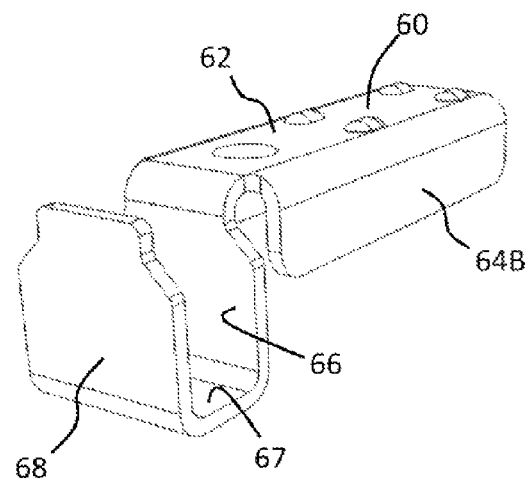
FIG. 5 is a perspective view of a stiffening member provided on the seat track assembly as shown in FIGS. 2 and 3.
Figure 6:
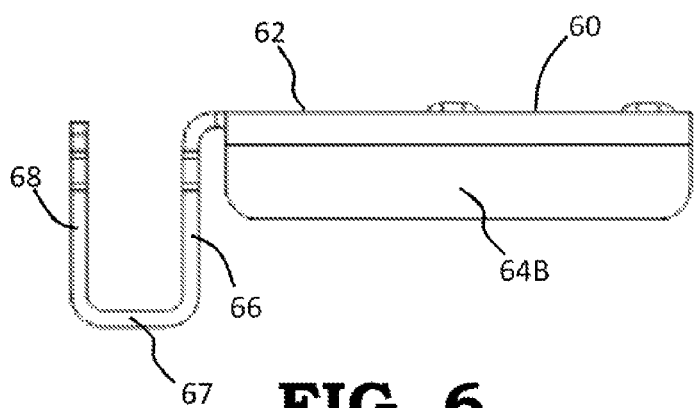
FIG. 6 is a side view of the stiffening member shown in FIG. 5.
Figure 7:
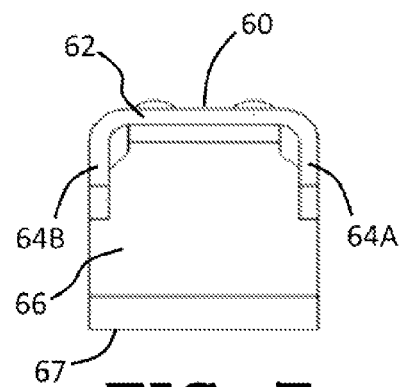
FIG. 7 is a rear view of the stiffening member shown in FIG. 5.

Referring now to FIGS. 5 through 7, the stiffening member 60 may be embodied as a bracket which can be generally formed from a rigid sheet of material, such as metal or the like. The stiffening member 60 may, alternatively, be formed from other suitable materials using other suitable processes. Further, it should be appreciated that the stiffening member 60 may be provided on the lower seat track 30.

As generally shown, the stiffening member 60 may include a top wall 62. In an embodiment, the top wall 62 may be secured to the upper base portion 42 of the upper seat track 40. For example, the stiffening member 60 may be secured to the upper base plate 42 by a welded connection, fasteners, or other suitable connections. As such, the top wall 62 may be oriented generally parallel with the upper base portion 42 of the upper seat track 40 and can extend along a longitudinal length of the upper base portion 42. In one aspect, the top wall 62 may provide axial support to the upper seat track 40.

The stiffening member 60 may also include a pair of side walls 64A and 64B that can be laterally spaced apart from one another and that can extend along a longitudinal length of the upper seat track 40. The side walls 64A and 64B may also extend in a generally vertical direction toward the lower seat track 30 from opposite edges of the top wall 62, respectively, such as generally shown in FIG. 7. As such, the side walls 64A and 64B may be oriented generally perpendicular to the top wall 62, although such is not required. In one aspect, the side walls 64A and 64B may provide added support along a longitudinal length of the top wall 62 and the upper seat track 40.

The stiffening member 60 may also include a first end wall 66. The first end wall 66 may extend in a generally vertical direction toward the lower seat track 30 from an edge of the top wall 62. As such, the first end wall 66 may be oriented generally perpendicular to the top wall 62, although such is not required. A second end wall 67 may extend in a generally horizontal direction from a lower edge of the first end wall 66. As such, the second end wall 67 may be oriented generally parallel with the top wall 62. A third end wall 68 may extend in a generally vertical direction toward the upper seat track 40 from a distal or free edge of the second end wall 67. As such, the third end wall 68 may be oriented generally parallel with and longitudinally spaced from the first end wall 66, which is oriented generally perpendicular to the top wall 62. Thus, the first end wall 66, the second end wall 67, and the third end wall 68 may define a generally U-shaped support member, as generally shown in FIG. 6. In other embodiments, however, the stiffening member 60 may have other suitable cross-sectional shapes and can include additional structural features.

As generally shown in FIG. 2, a portion of the stiffening member 60, such as the U-shaped support member defined by the first end wall 66, the second end wall 67, and the third end wall 68, may extend laterally between the inner rails 44A and 44B to provide lateral support to the upper seat track 40. For example, a portion of the stiffening member 60, such as the first end wall 66 and/or the third end wall 68 for example, may have a lateral width that is equal to or slightly smaller than the lateral distance between the inner rails 44A and 44B of the upper seat track 40. In other embodiments, however, other suitable portions of the stiffening member 60 may extend laterally between the inner rails 44A and 44B to provide lateral support to the upper seat track 40. At least one aspect and/or purpose of the laterally extending portion of the stiffening member 60 will be generally disclosed below.

Referring again to FIGS. 2 and 3, a second support member, such as a skid member 70, may be provided on the lower seat track 30. As generally shown in FIG. 3, the skid member 70 may extend in a generally vertical direction toward the upper seat track 40. In other embodiments, however, the skid member 70 may be provided on the upper seat track 40 and extend in a generally vertical direction toward the lower seat track 30.

Figure 8:
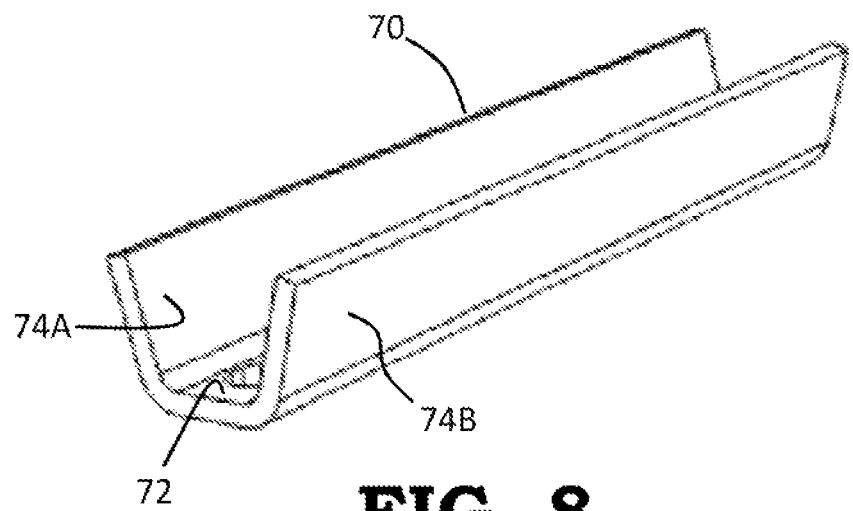
FIG. 8 is a perspective view of a skid member provided on the seat track assembly as shown in FIGS. 2 and 3.
Figure 9:
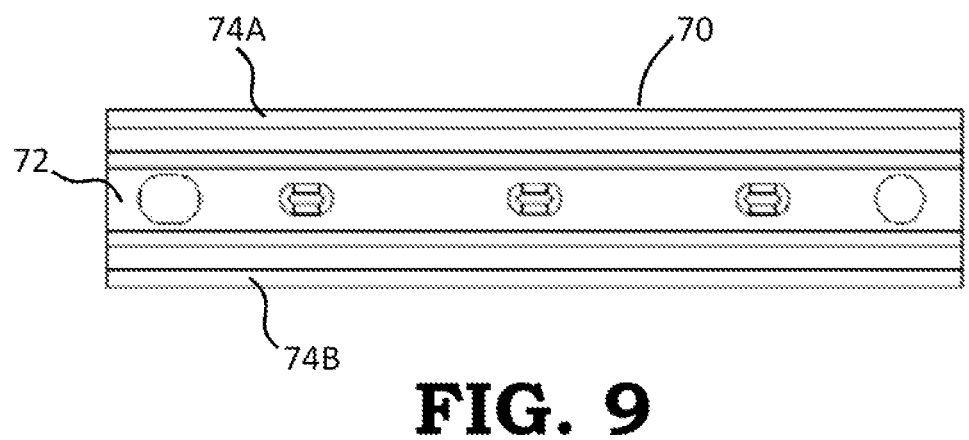
FIG. 9 is a top plan view of the skid member shown in FIG. 8.

Referring now to FIGS. 8 and 9, the skid member 70 may be embodied as a bracket which can be generally formed from a rigid sheet of material, such as metal or the like. The skid member 70 may, alternatively, be formed from other suitable materials using other suitable processes.

As generally shown, the skid member 70 may generally include a bottom wall 72. The bottom wall 72 may be secured to the lower base portion 32 of the lower seat track 30. For example and without limitation, the skid member 70 can be secured to the lower base portion 32 by a welded connection, fasteners, or other suitable connections. As such, the bottom wall 72 may be oriented generally parallel with the lower base portion 32 of the lower seat track 30 and can extend along a longitudinal length of the lower base portion 32. In one aspect, the bottom wall 72 may provide support along a longitudinal length of the lower seat track 30.

The skid member 70 may also include a pair of side walls 74A and 74B that can be laterally spaced apart from one another and that can extend along a longitudinal length of the lower seat track 30. The side walls 74A and 74B of the skid member 70 may also extend in a generally vertical direction toward the upper seat track 40 from opposite edges of the bottom wall 72, respectively, such as generally shown in FIG. 8. As such, the skid member 70 can have a generally U-shaped cross-section when viewed from an end thereof. In other embodiments, however, the skid member 70 may have other cross-sectional shapes including, but not limited to, an inverted U-shape, a T-shape, or an I-shape. The skid member 70 may also have a suitable length, height, and/or width for a particular application. For example, the skid member 70 may have a longitudinal length that generally corresponds to a length of travel of the upper seat track 40 relative to the lower seat track 30. Further, the skid member 70 can have a height that is equal to or slightly smaller than the vertical distance between the lowest portion of the stiffening member 60 and the lower base portion 32 of the lower seat track 30.

Referring again to FIGS. 2 and 3, when the upper seat track 40 is assembled to the lower seat track assembly 30, the stiffening member 60 can be positioned vertically above the skid member 70. Thus, when relatively large vertical loads (e.g., submarine forces) are applied to the upper seat track 40, such as during a collision for example, the upper seat track 40 may have a tendency to move in a generally downward vertical direction toward the lower seat track 30. If this occurs, the stiffening member 60 may come into engagement with the skid member 70. As such, the stiffening member 60 and the skid member 70 may be configured to prevent or reduce (i.e., restrict) further movement of the upper seat track 40 in a downward direction relative to the lower seat track 30. In particular, the stiffening member 60 and the skid member 70 may transfer vertical loads from the upper seat track 40 to the floor 16, or more specifically, to a frame of the vehicle.

Although the stiffening member 60 and the skid member 70 in the illustrated embodiment generally operate in conjunction with one another to provide vertical support to the upper seat track 40, it should be appreciated that the stiffening member 60 or the skid member 70 may be individually designed to provide vertical support to the upper seat track 40 without the need for both support members. In one example, a portion of the stiffening member 60 may have a height that is equal to or slightly smaller than the vertical distance between the lower base portion 32 of the lower seat track 30 and the upper base portion 42 of the upper seat track 40. As such, the stiffening member 60 may be configured to prevent or reduce movement of the upper seat track 40 in a downward direction relative to the lower seat track 30 without a need for the skid member 70. Conversely, a portion of the skid member 70 may have a height that is equal to or slightly smaller than the vertical distance between the lower base portion 32 of the lower seat track 30 and the upper base portion 42 of the upper seat track 40 to provide vertical support.

The stiffening member 60 may also be configured to provide lateral support for the upper seat track 40. For example, as generally disclosed, a portion of the stiffening member 60, such as the first end wall 66 and/or the third end wall 68 for example, may have a lateral width that is equal to or slightly smaller than the lateral distance between the inner rails 44A and 44B of the upper seat track 40. As such, when a relatively large vertical load is applied to the upper seat track 40, such as during a collision for example, the stiffening member 60 can be configured to prevent or reduce (i.e., restrict) deformation of the inner rails 44A and 44B in an inward direction toward one another.

The principal and mode of operation of this invention have been explained and illustrated in various embodiments. However, it must be understood that the concepts may be practiced other than as specifically explained and illustrated without departing from their spirit or scope.

What is claimed is:
1. A seat track assembly comprising:
   a lower seat track having a pair of opposing outer rails;
   an upper seat track having a pair of opposing inner rails, wherein the inner rails of the upper seat track cooperate with the outer rails of the lower seat track to support the upper seat track for movement on the lower seat track; and
   a support member provided between the lower seat track and the upper seat track, wherein the support member includes a first U-shaped portion including a plurality of longitudinally-extending walls and the support member includes a second U-shaped portion including a plurality of laterally-extending walls.

2. The seat track assembly of claim 1, wherein the support member is secured to the upper seat track, and the plurality of laterally-extending walls includes a first wall extending in a vertical direction from the upper seat track toward the lower seat track.

3. The seat track assembly of claim 2, wherein the plurality of laterally-extending walls includes a second wall extending in a horizontal direction from the first wall, and a third wall extending in a vertical direction from the second wall toward the upper seat track assembly.

4. The seat track assembly of claim 2, further including a skid member that is provided on the lower seat track, wherein the skid member is located between the second wall of the support member and the lower seat track.

5. The seat track assembly of claim 4, wherein a maximum height of the support member plus a maximum height of the skid member is substantially equal to a vertical distance between a lower base portion of the lower seat track and an upper base portion of the upper seat track.

6. The seat track assembly of claim 4, wherein the skid member is secured to the lower seat track, and the skid member includes at least one side wall extending at an oblique angle relative to a vertical direction toward the upper seat track.

7. The seat track assembly of claim 4, wherein the skid member includes a U-shaped cross-section with a pair of side walls that are laterally spaced apart from one another.

8. The seat track assembly of claim 4, wherein the skid member extends along a longitudinal length of the lower seat track and a length of the skid member generally corresponds to a length of travel of the upper seat track relative to the lower seat track.

9. The seat track assembly of claim 4, wherein the skid member includes a U-shaped cross-section.

10. The seat track assembly of claim 1, wherein the plurality of longitudinally-extending walls includes a pair of laterally spaced apart side walls extending along a longitudinal length of the upper seat track.

11. The seat track assembly of claim 1, wherein each of the plurality of longitudinally-extending walls is disposed substantially parallel to a respective wall of the upper seat track.

12. The seat track assembly of claim 1, wherein the plurality of longitudinally-extending side walls include two substantially vertical walls and a substantially horizontal wall and the plurality of laterally-extending walls include two substantially vertical walls and a substantially horizontal wall.

13. A vehicle seat assembly comprising:
a seat bottom;
a seat back supported on the seat bottom; and
a seat track assembly supporting the seat bottom, the seat track assembly comprising:
  a lower seat track having a pair of opposing outer rails;
  an upper seat track having a pair of opposing inner rails, wherein the inner rails of the upper seat track cooperate with the outer rails of the lower seat track via bearing elements to support the upper seat track for movement on the lower seat track; and
  a support member provided between the lower seat track and the upper seat track, wherein the support member includes a first U-shaped portion including a plurality of longitudinally-extending walls and the support member includes a second U-shaped portion including a plurality of laterally-extending walls.

14. The seat assembly of claim 13, further including a skid member that is provided on the lower seat track, and the skid member is located between the support member and the lower seat track.

15. The seat assembly of claim 14, wherein a maximum height of the support member plus a maximum height of the skid member is substantially equal to a vertical distance between a lower base portion of the lower seat track and an upper base portion of the upper seat track.

16. The seat assembly of claim 13, wherein the plurality of longitudinally-extending walls includes a first wall, a second wall, and a third wall; the first wall and the second wall extend vertically downward from the third wall, and the third wall is parallel to and secured to an upper base portion of the upper seat track.

17. The seat assembly of claim 13, wherein a portion of the support member has a lateral width that is substantially equal to a lateral distance between the inner rails of the upper seat track.

18. The seat track assembly of claim 13, wherein the first U-shaped portion is disposed substantially perpendicularly to the second U-shaped portion, the first U-shaped portion opens downward, and the second U-shaped portion opens upward.

19. The seat track assembly of claim of claim 1, including a second support member provided between the lower seat track and the upper seat track, wherein the second support member includes a first U-shaped portion including a plurality of longitudinally-extending walls and the support member includes a second U-shaped portion including a plurality of laterally-extending walls; and the second support member is disposed at or about an opposite end of the upper seat track.

20. The seat track assembly of claim 1, comprising a skid member provided on the lower seat track and disposed entirely below the support member.

* * * * *

UNITED STATES PATENT AND TRADEMARK OFFICE
CERTIFICATE OF CORRECTION

| | | |
|---|---|---|
| PATENT NO. | : 9,751,431 B2 | Page 1 of 1 |
| APPLICATION NO. | : 14/730815 | |
| DATED | : September 5, 2017 | |
| INVENTOR(S) | : Walter et al. | |

It is certified that error appears in the above-identified patent and that said Letters Patent is hereby corrected as shown below:

In the Claims

At Column 7, Claim number 4, Line number 13, delete "claim 2" and insert --claim 3.--

At Column 7, Claim number 12, Line number 46, delete the word "side" after "longitudinally-extending."

At Column 8, Claim number 19, Line number 42, delete "of claim" after "assembly."

Signed and Sealed this
Sixteenth Day of January, 2018

Joseph Matal
*Performing the Functions and Duties of the
Under Secretary of Commerce for Intellectual Property and
Director of the United States Patent and Trademark Office*